C. J. COBERLY.
WELDING TORCH.
APPLICATION FILED JUNE 8, 1920.
1,436,433.
Patented Nov. 21, 1922.
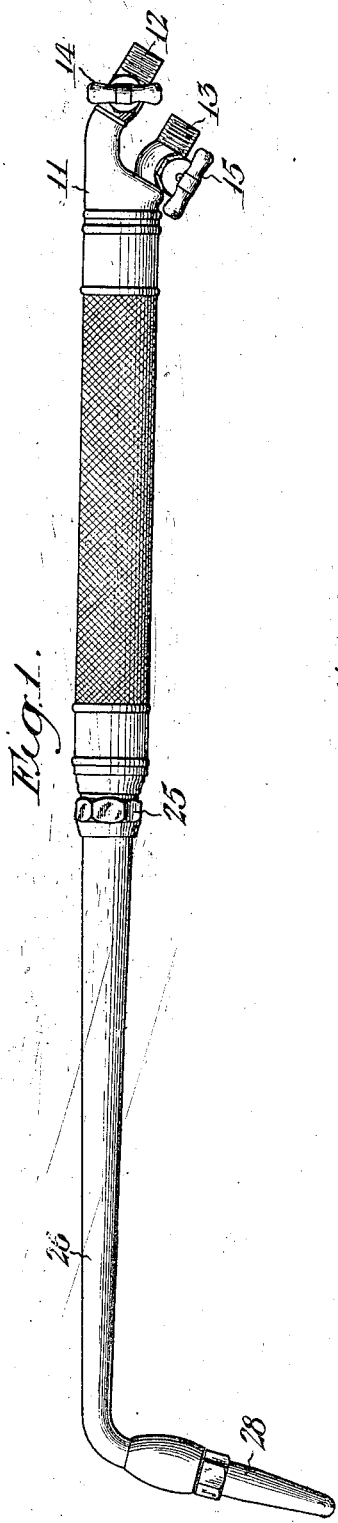
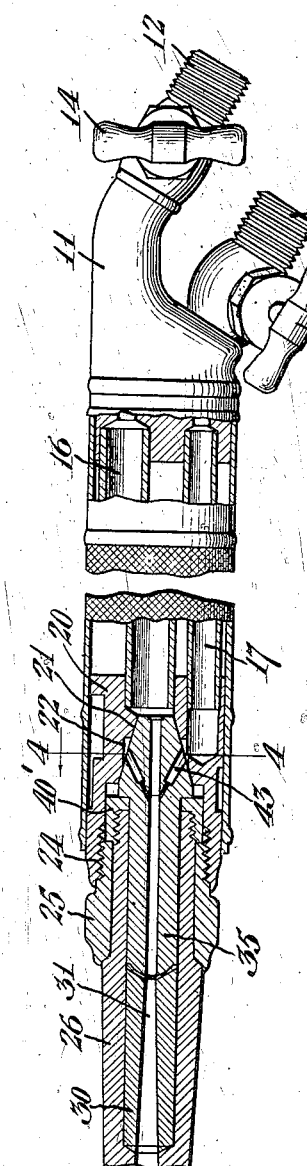
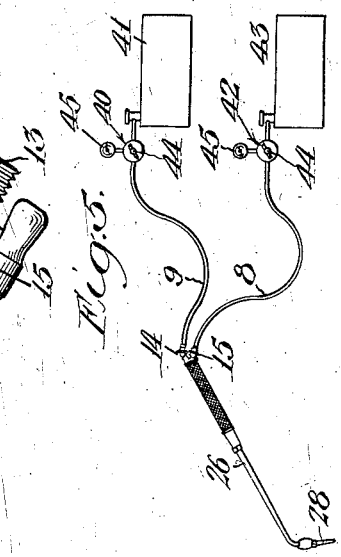
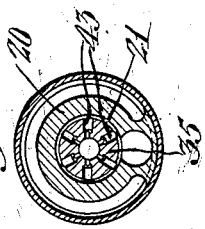
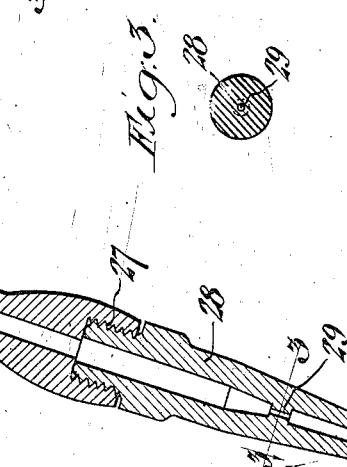
Inventor
Clarence J. Coberly
by Graham + Harris
Attorneys Patented Nov. 21, 1922.

1,436,433

UNITED STATES PATENT OFFICE.

CLARENCE J. COBERLY, OF LOS ANGELES, CALIFORNIA, ASSIGNOR TO CALIFORNIA BURDETT OXYGEN COMPANY, A CORPORATION OF CALIFORNIA.

WELDING TORCH.

Application filed June 8, 1920. Serial No. 387,487.

*To all whom it may concern:*

Be it known that I, CLARENCE J. COBERLY, a citizen of the United States, residing at Los Angeles, in the county of Los Angeles and State of California, have invented a new and useful Welding Torch, of which the following is a specification.

My invention relates to torches used for welding and is particularly applicable to a torch using oxygen and acetylene as a fuel.

An object of my invention is to provide a torch in which the size of tip can be readily changed without necessity of any adjustment or change in the mixer or other parts of the torch.

The invention resides in the peculiar combination and arrangement of parts described in the following specification and illustrated on the annexed drawing.

Referring to this drawing which is for illustrative purposes only,

Fig. 1 is a side elevation of a torch embodying my invention.

Fig. 2 is an elevation on an enlarged scale, a portion of the torch being broken away and shown in section to better illustrate the internal structure.

Fig. 3 is a section on a plane represented by the line 3—3 of Fig. 2, and

Fig. 4 is a section on a plane represented by the line 4—4 of Fig. 2.

Fig. 5 is a diagram of connections.

In the form of the invention shown, a body 11 is provided, this body having a connection 12 for an oxygen supply pipe 9, and a connection 13 for an acetylene pipe 8, valves 14 and 15 being provided to control the flow of these gases. The connection 12 connects with a bent oxygen pipe 16 and the connection 13 connects with an acetylene pipe 17. The pipes 16 and 17 are secured in a head 20, the pipe 16 leading directly into a conical cavity 21 formed in the head, and the pipe 17 leading into an annular chamber 22 in the walls of this cavity. The head 20 has an internal thread shown at 24, this thread being engaged by a nut 25 which is free to turn on a goose neck 26. The goose neck is bent as shown and is threaded at 27 for the reception of a removable tip 28 which has a central passage with a constriction 29 therein. Formed in the gooseneck is a cylindrical bore in which a bushing 30 is driven, this bushing having a tapered passage 31 therein. The end of the bushing 30 is adjacent to but separated from the end of a mixing tube 35 which is provided with an enlarged head tapered to fit in the conical cavity 21. The nut 25 is held in place by a clamping ring 40, threaded on the gooseneck 26. The mixing tube 35 has a central passage therethrough which connects the hole 31 in the bushing 30 with the oxygen pipe 16. The mixing tube 35 is also provided with a plurality of small passages 43 connecting the groove 22 with the central passage in the mixing tube.

One of the principal objects of the invention is to provide a torch which can be readily manufactured and assembled. It will be noted that the nut 25 is free to turn on the gooseneck 26 but is restrained from moving axially thereon by means of the clamping ring 40'. By releasing the nut 25, the gooseneck, with the mixing tube 35 and the bushing 30, may be taken entirely out of the head 20 for repairs or for the purpose of substituting a different size of mixer.

In practice the pipe 9 connects through a regulator 40 with a tank 41 and the pipe 8 connects through a regulator 42 with a tank 43. The regulators 40 and 42 are each provided with an adjusting screw 44 by which the pressure delivered to the pipes 8 and 9 may be regulated, this pressure being indicated on gauges 45. The parts 40 to 45 inclusive are standard in the art and need not be more specifically described.

The method of operation is as follows:

The oxygen passes through the pipe 16 into the central opening in the mixing tube 22 and into the enlarged passage formed by the tapered hole 31 and by the continuation of that passage formed in the gooseneck 26, and thus through the tip 28. The acetylene passes through the pipe 18 and into the groove 22, passing through the small passages 43 into the central passage in the mixing tube where it is directly mixed with the oxygen, the mixture passing through the gooseneck 26 through the constriction 29 and emerging from the tip where the mixture is burned.

The constriction 29 shown in section 3—3 of the tip is for the purpose of controlling the flow of gas. The reason for this constriction in the tip is that it is desirable to use several sizes of tips without changing the other features of the torch, and it is also desirable to use pressures of gas corresponding to the size of the tip being used. If the gas pressure were varied with several sizes of tips and one mixer 35, flames of a different character would result because of the fact that the flow of gas would be too great on the small size tip. To restrict this flow to the proper amount I provide the correct size of constriction 29 which of course is different in each size of tip and therefore is changed when changing tips. The reason for using this construction is that it is desirable to use pressures corresponding to tip number. The ordinary practice has been to change both the tip and mixer but by having the constriction 29 in different sized tips made so that with a single mixer the flow of gas is regulated to suit each tip, it is only necessary to change the tip and to set the pressure at the regulator to correspond to tip number. In practice the tip number indicates the proper pressure for each gas, this pressure being automatically controlled by the regulators 40 and 42 which are manually adjusted to the desired value. By this method an inexperienced man can produce excellent results.

I claim as my invention:

1. A welding torch comprising a head having a thread formed thereon, a pipe delivering gas to a conical cavity in said head, a pipe delivering gas to a groove in the walls of said cavity, a gooseneck, a nut on said gooseneck having a thread engaging said thread on said head, and a mixing tube fitting in an opening in said gooseneck and having a shoulder fitting against the end of said gooseneck and an enlarged head tapered to fit in said cavity, said mixing tube having a continuous central passage therethrough which is connected with said groove by inclined passages.

2. A welding torch comprising a head having a thread formed thereon, a pipe delivering gas to a conical cavity in said head, a pipe delivering gas to a groove in the walls of said cavity, a gooseneck, a nut restrained against axial movement on the gooseneck but free to turn on said gooseneck having a thread engaging said thread on said head, and a mixing tube fitting in an opening in said gooseneck and having a shoulder fitting against the end of said gooseneck and an enlarged head tapered to fit in said cavity, said mixing tube having a continuous central passage therethrough which is connected with said groove by inclined passages.

3. A welding torch comprising a head having a thread formed thereon, a pipe delivering gas to a conical cavity in said head, a pipe delivering gas to a groove in the walls of said cavity, a gooseneck, a nut free to turn on said gooseneck, a clamping ring on said gooseneck preventing axial movement of said nut on said gooseneck, and a mixing tube fitting in an opening in said gooseneck and having a shoulder fitting against the end of said gooseneck and an enlarged head tapered to fit in said cavity, said mixing tube having a continuous central passage therethrough which is connected with said groove by inclined passages.

In testimony whereof, I have hereunto set my hand at Los Angeles, California, this 28th day of May, 1920.

CLARENCE J. COBERLY.